US012135797B2

(12) United States Patent
Saluja et al.

(10) Patent No.: US 12,135,797 B2
(45) Date of Patent: Nov. 5, 2024

(54) DEVICE DATA-AT-REST SECURITY USING EXTENDED VOLUME ENCRYPTION DATA

(71) Applicant: VMware, Inc., Palo Alto, CA (US)

(72) Inventors: Neeraj Saluja, Round Rock, TX (US); Muhammad Anadil Furqan, Austin, TX (US); Kevin B. Sheehan, Bloomfield, CT (US)

(73) Assignee: Omnissa, LLC, Palo Alto, CA (US)

( * ) Notice: Subject to any disclaimer, the term of this patent is extended or adjusted under 35 U.S.C. 154(b) by 328 days.

(21) Appl. No.: 17/371,198

(22) Filed: Jul. 9, 2021

(65) Prior Publication Data

US 2023/0016069 A1 Jan. 19, 2023

(51) Int. Cl.
*G06F 21/60* (2013.01)
*G06F 3/06* (2006.01)

(52) U.S. Cl.
CPC .......... *G06F 21/602* (2013.01); *G06F 3/0623* (2013.01); *G06F 3/0655* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 6,286,098 B1 * | 9/2001 | Wenig | ................. | H04L 63/1425 713/151 |
| 9,275,233 B1 * | 3/2016 | Lu | ....................... | G06F 16/1794 |
| 10,277,562 B1 * | 4/2019 | Frederick | ............ | H04L 63/0272 |
| 10,992,670 B1 * | 4/2021 | Drooger | .............. | H04L 63/0428 |
| 11,418,582 B1 * | 8/2022 | Swain | .................... | H04L 67/145 |
| 11,768,611 B2 * | 9/2023 | Kloth | .................... | G06F 9/4403 713/2 |
| 2003/0163717 A1 * | 8/2003 | Yoshimoto | .............. | G06F 21/78 713/193 |
| 2004/0039911 A1 * | 2/2004 | Oka | ........................ | G06F 21/10 705/51 |
| 2007/0074292 A1 * | 3/2007 | Mimatsu | ............. | H04L 63/0428 713/193 |
| 2007/0208947 A1 * | 9/2007 | Sudo | ....................... | H04L 51/58 713/184 |
| 2008/0065882 A1 * | 3/2008 | Goodman | .............. | G06F 21/78 713/165 |

(Continued)

OTHER PUBLICATIONS

BahmanA. Sassani (Sarrafpour), MohammedAlkorbi, Noreen Jamil ,M.AsifNaeem, and Farhaan Mirza Evaluating Encryption Algorithms for Sensitive Data Using Different Storage Devices Hindawi Scientific Programming vol. 2020 Article ID 6132312 (Year: 2020).*

*Primary Examiner* — Richard A McCoy
(74) *Attorney, Agent, or Firm* — Kim & Stewart LLP

(57) ABSTRACT

Examples of scheduled and on-demand volume encryption suspension are described. A management service can identify multi-volume encryption rules for local volumes of a client device including the operating system volume as well as non-operating-system volumes. The encryption rules can be transmitted to the client device. Volume encryption samples for the client device can be received, and a console user interface can be generated to indicate compliance status information for the multi-volume encryption rules for local volumes of a client device.

20 Claims, 7 Drawing Sheets

(56) References Cited

U.S. PATENT DOCUMENTS

| | | | |
|---|---|---|---|
| 2010/0138656 A1* | 6/2010 | Chinen | G06F 21/577 |
| | | | 713/168 |
| 2011/0154052 A1* | 6/2011 | Yang | G11B 20/00876 |
| | | | 713/189 |
| 2012/0036370 A1* | 2/2012 | Lim | G06F 21/602 |
| | | | 713/189 |
| 2012/0204024 A1* | 8/2012 | Augenstein | G06F 11/1453 |
| | | | 713/150 |
| 2013/0160139 A1* | 6/2013 | Goel | G06F 21/57 |
| | | | 726/27 |
| 2014/0024345 A1* | 1/2014 | Mahaffey | H04W 12/08 |
| | | | 455/411 |
| 2014/0157353 A1* | 6/2014 | Shim | H04W 12/30 |
| | | | 726/1 |
| 2014/0173733 A1* | 6/2014 | Ford | H04L 63/1416 |
| | | | 726/23 |
| 2016/0041970 A1* | 2/2016 | Tripathy | G06F 40/205 |
| | | | 707/755 |
| 2016/0330217 A1* | 11/2016 | Gates | H04L 63/1441 |
| 2019/0190890 A1* | 6/2019 | Druker | G06F 21/6254 |
| 2020/0175184 A1* | 6/2020 | Ved | G06F 3/067 |
| 2021/0110052 A1* | 4/2021 | Lee | G06F 21/6218 |
| 2021/0117514 A1* | 4/2021 | Kushtagi | H04L 9/3213 |

\* cited by examiner

Device Encryption Rules 132
*(e.g., Device-Wide, Multi-Volume, including System-Drive Data, Non-System Drive Rules, etc.)*

| System Volume Encryption Rules 203 | Non-System Volume Encryption Rules 206 | Removable Drive Encryption Rules 209 | Multi-Volume Encryption Rules 212 |

Volume Encryption Sample(s) 134
*(e.g., Device-Wide, Multi-Volume, including System-Drive Data, Non-System Drive Data, etc.)*

| Device Identifier 215 (e.g., UDID) | System Volume Encryption Status 218 | System Volume Encryption Type 221 | System Volume Encryption Adequacy 224 |

| Recovery Key(s) Stored 227 | Recovery Key(s) 230 | Recovery Key Length(s) 233 | Device Summary Encryption Status 236 |

| Volume-Specific Encryption Data 239 | Enabled Users 249 |

*FIG. 2*

```
Console User Interface of UEM Service 120
```

503 — Device Encryption Configuration

| | | |
|---|---|---|
| Encrypted Volumes: | System Partition or Drive ⌄ / All Fixed Drives | ◂506 |
| Encryption Type: | AES-256 ⌄ / XTS-256 | ◂509 |
| Only Encrypt Used Space During Initial Encryption? | ☐ ◂512 | |
| Custom URL for Recovery Screen 515 | Https://[Custom Device Services Host Name]/mydevice | |
| Force Encryption? | ☐ ◂518 | |
| Recovery Key Options | Same Key for All Drives ⌄ / Separate Key for Each Drive | ◂521 |
| Authentication Mode | TPM ⌄ | ◂524 |
| Enforce PIN | ☐ ◂527 | |
| PIN Length | 4  ◂530 | |
| Enhanced PIN? 533 | ☐ Alphanumeric   ☐ AlphaNum + Spec Chars | |
| User PW if TPM Unavailable? | ☐ ◂539 | |
| Suspend Encryption Until TPM Initialized? | ☐ ◂542 | |

*FIG. 5*

Console User Interface of UEM Service 120

703 — Devices › Security Summary

Developer1's PC Security Overview
706
- ✓ Managed by UEM
- ✓ Firewall
- ✓ OS Update
- ✓ Full Disk Encryption
- ⚠ System Volume Encryption Status: ON, Partially Protected
- ⚠ Non-system Fixed Volume Encryption Status: Unencrypted Drives Present
- ⚠ Removable Volume Encryption Status: Unencrypted Removable Volume Connected
- ⓘ Access Recovery Key
- ⚠ BIOS Verification

Hardware  Device Not Compromised

Encryption
  OS Volume:
712
  Volume C [OS Volume]  Key Protectors:
  Volume Encrypted  TPM+PIN
  <u>View Recovery Key</u>  Numerical Password
  Full Disk Encryption
  Encryption Type: AES-128, Mismatch - AES-256 Specified

Data Volumes:
715
  Volume D [Ganymede]  Key Protectors:
  Volume Encrypted  External Key (Req. for Auto-Unlock)
  <u>View Recovery Key</u>  Numerical Password
  Used Space Encryption
  Encryption Type: XTS-128, Mismatch - AES-256 Specified

Volume E [Callisto]  Key Protectors:
  Volume Unencrypted  Numerical Password

Removable Drives Connected:
718
  Volume F [Jormungand]
  Volume Unencrypted

Volume G – Registered to User_123
  Volume Encrypted
  <u>View Recovery Key</u>
  Full Disk Encryption
  Encryption Type: AES-256, Compliant

*FIG. 7*

DEVICE DATA-AT-REST SECURITY USING EXTENDED VOLUME ENCRYPTION DATA

BACKGROUND

Mobile devices are being used for access to enterprise computing systems and resources with greater frequency. With the growing number of different mobile devices, platforms, and operating systems available for adoption by users, various challenges can arise in the management of the mobile devices. Access to the capabilities of a mobile device can be managed through the administration of the suite of applications based on a set of management policies, compliance rules, and configuration data which is defined and enforced by the management service.

The proliferation of tablet and smartphone devices, for example, has resulted in several companies and organizations allowing employees to bring their own devices to work. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

Volume encryption can be part of the enterprise information security strategy for organizations. Enterprises can enforce operating-system-based encryption technologies to enforce operating system and disk volume encryption to ensure their assets and intellectual property remain secure. However, existing technologies can enforce encryption that is limited to the operating system volume and can provide little or no information beyond whether that particular volume is "encrypted" or "unencrypted." This can leave enterprise devices open to vulnerabilities even for those devices that are indicated as "encrypted." Accordingly, a better solution is needed to ensure device encryption and data protection for enterprise data.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 2 illustrates examples of volume encryption samples and device encryption polices utilized to provide data-at-rest security for managed client devices, according to various examples described herein.

FIG. 5 illustrates an example user interface for data-at-rest security for managed client devices, according to various examples described herein.

FIG. 7 illustrates another example user interface for data-at-rest security for managed client devices, according to various examples described herein.

DETAILED DESCRIPTION

The present disclosure relates to data-at-rest security for managed client devices using extended and more comprehensive volume encryption data. As noted above, volume encryption can be part of an enterprise information security strategy for organizations. Enterprises can enforce operating-system-based and other encryption technologies to enforce fixed disk volume encryption to ensure their assets and intellectual property remain secure. Existing technologies can enforce encryption that is limited to a disk or volume where the operating system is stored. However, many devices have multiple drives including non-operating-system fixed drives as well as removable drives. This can leave enterprise devices open to vulnerabilities even for devices that are indicated as "encrypted" by existing technologies. However, the present disclosure describes mechanisms that can enable data-at-rest security by sampling and analyzing an extended and more comprehensive set of volume encryption data for client devices that are managed by a management service such as a unified endpoint management (UEM) service.

Figure 1:
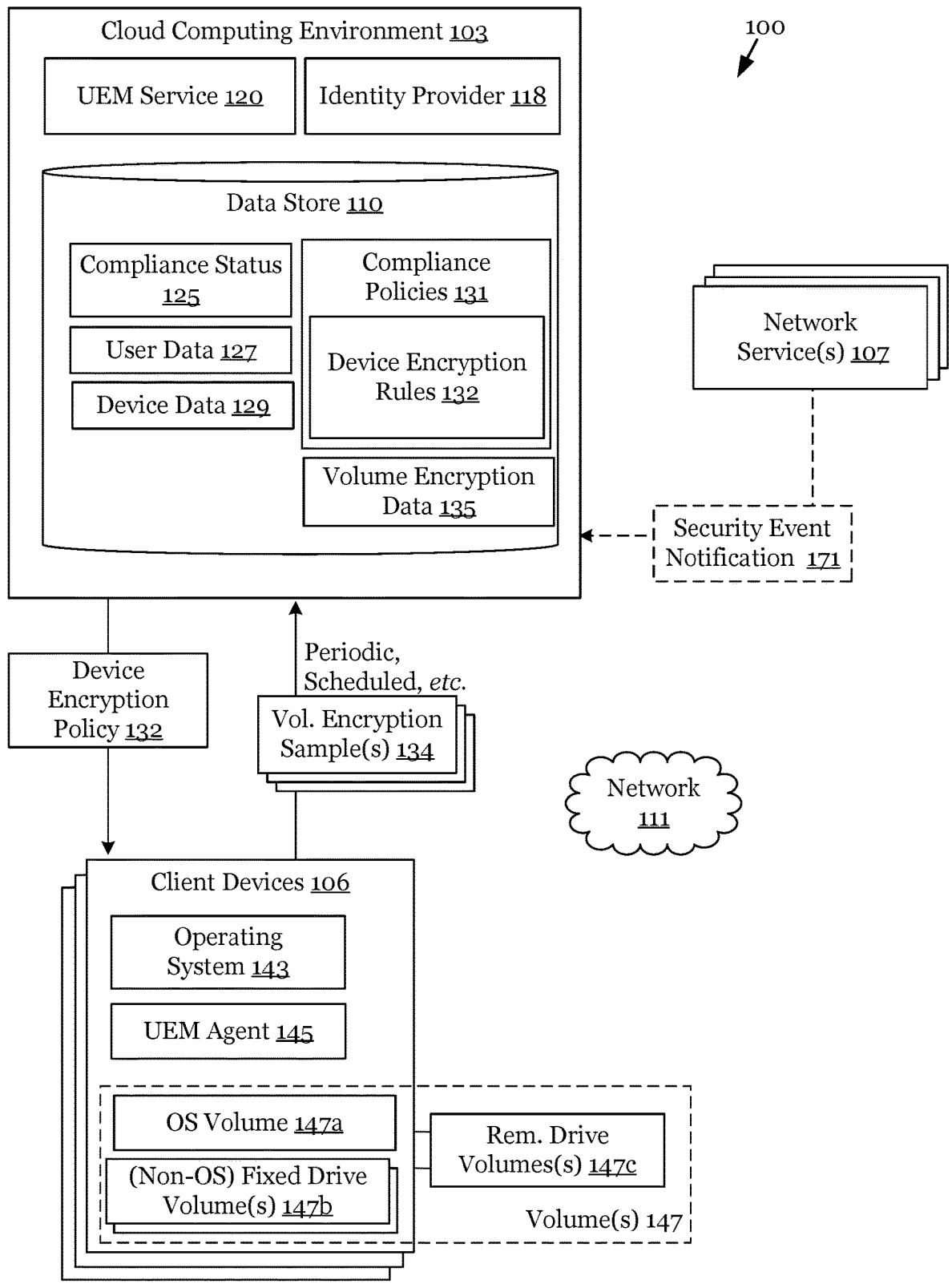
FIG. 1 illustrates an example networked environment that includes components that provide data-at-rest security for managed client devices, according to various examples described herein.

FIG. 1 illustrates an example networked environment 100 that includes components that provide data-at-rest security for managed client devices using an extended set of volume encryption data. The networked environment 100 can include a cloud computing environment 103, several client devices 106, and network services 107 in communication through a network 111. The components of the networked environment 100 can generate and enforce comprehensive rules that ensure encryption compliance device wide, including rules and compliance polices 131 that involve multiple volumes 147, including operating system volumes 147a, non-operating-system fixed drive volumes 147b, and removable drive volumes 147c for removable drives connected to the client device 106.

The cloud computing environment 103 can be embodied as one or more computers, computing devices, or computing systems. In certain embodiments, the cloud computing environment 103 can include one or more computing devices arranged, for example, in one or more server or computer banks. The computing device or devices can be located at a single installation site or distributed among different geographical locations. The cloud computing environment 103 can include a plurality of computing devices that together embody a hosted computing resource, a grid computing resource, or another distributed computing arrangement. In some cases, the cloud computing environment 103 can be embodied as an elastic computing resource where an allotted capacity of processing, network, storage, or other computing-related resources vary over time. As further described below, the cloud computing environment 103 can also be embodied, in part, as certain functional or logical (e.g., computer-readable instructions) elements or modules as described herein.

The cloud computing environment 103 can operate as an environment for mobile device management and a unified endpoint management (UEM) platform that can manage the client devices 106, fixed drives 147, and other devices and endpoints. In that context, the cloud computing environment 103 includes a data store 110. The cloud computing environment 103 can also execute a UEM service 120 and an identity provider 118. The data store 110 includes areas in memory for the storage of a compliance status 125, user data 127, device data 129, compliance policies 131, and device encryption rules 132, among other types of data. The UEM service 120 can operate as a UEM platform that can manage client devices 106 that are enrolled as managed devices with the UEM service 120.

The network 111 can include the Internet, intranets, extranets, wide area networks (WANs), local area networks (LANs), wired networks, wireless networks, cable networks, satellite networks, other suitable networks, or any combinations thereof. As one example, the cloud computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the cloud computing environment 103, the network service 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The identity provider 118 can provide single sign-on or identity management capabilities for an enterprise. The identity provider 118 can allow users to authenticate his or her identity to obtain an authentication token that can be provided to an network service 107. The identity provider 118 can utilize OAuth, security assertion mark-up language (SAML), or other single sign-on methodologies. The identity provider 118 and UEM service 120 can communicate so that the UEM service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

The UEM service 120 can transmit compliance policies 131, compliance rules, and configuration data for execution by and/or enforcement on the client device 106. In that context, during or after enrollment, the UEM service 120 can retrieve or generate a set of management policies, compliance rules, and configuration data for the client device 106 and transfer those policies, rules, and data to the client device 106 for reference by the operating system 143 and certain applications executing on the client device 106.

The UEM service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices, according to organizational or other factors or considerations.

The UEM service 120 can ensure compliance of the client device 106 in conjunction with the UEM agent 145 and other instructions executed by the cloud computing environment 103 and the client device 106. For example, the UEM service 120 can transmit the device encryption rules 132 to the UEM agent 145 for enforcement.

The device encryption rules 132 can be applied using policies, profiles, baselines, and other instructions. The UEM agent 145 can apply the policies, profiles, and baselines, and execute the instructions in order to enforce the device encryption rules 132 and collect information to assess compliance. The device encryption rules 132 can specify information to include in volume encryption samples 134, as well as instructions for how to query applications and the operating system 143 to collect the information.

The device encryption rules 132 can specify a remedial action such that the UEM agent 145 can detect a violation of the device encryption rules 132 and perform the remedial action automatically or in response to administrative approval. Detecting a violation can result in the client device 106 being marked or flagged as non-compliant by the UEM service 120. The remedial action includes providing a notification of the violation along with an updated volume encryption sample 134, and additional device state data, to the UEM service 120 once a violation is detected. Depending on severity or risk involved, the remedial actions can include generating a notification on the client device 106, transmitting a notification to the UEM service 120, locking the client device 106 such that it is inoperable, generating an enterprise wipe such as removal of enterprise data from the client device 106, generating automatic reconfiguration of the client device 106 such that it is in compliance with the device encryption rules 132, and so on. The UEM service 120 can generate the notification in a user interface that includes the compliance policy 131 and device encryption rules 132 that are violated, as well as a recommended remedial action based on the device encryption rules 132. A user can select a user interface element to approve and implement the recommended remedial action.

Reconfiguration can include updating encryption to full volume encryption from used space encryption, encryption of unencrypted operating system volumes 147a, encryption of unencrypted non-operating-system volumes 147b, encryption of unencrypted removable volumes 147c, as well as decryption and re-encryption of all or a specified type of encrypted volumes 147 that have an encryption type mismatch. A remedial action can also require administrative approval. The UEM agent 145 can transmit the violation notification to the UEM service 120, an administrator can approve a predetermined or selected remedial action.

The UEM service 120 can also maintain a suspend encryption API. A network service 107 can invoke the suspend encryption API, providing a device identifier, a suspension limit, and a description of or code associated with a reason to suspend encryption as parameters. The network service 107 can identify that a client device 106 is associated with an update, identify an appropriate suspension limit based on the update, and invoke the suspend encryption API. A client device 106 with appropriate authentication can also invoke the suspend encryption API.

In some examples, once authentication is completed by the UEM service 120 and the identity provider 118, the network service 107 and the client device 106 can communicate directly. The UEM agent 145 can invoke the API or function of the network service 107 to store, modify, and retrieve removable drive recovery keys from the network service 107. In other cases, the UEM service 120 can work as a pass-through or intermediate between the client device 106 and the network service 107.

The client devices 106 are representative of one or more client devices 106. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communication devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the UEM service 120 for device management. A UEM agent 145 can be installed on a client device 106 to locally manage the device on behalf of the remotely executed UEM service 120. The UEM agent 145 can be installed with elevated privileges or be effectuated through operating system APIs to manage the client device 106 on behalf of the UEM service 120. The UEM agent 145 can have the authority to manage data on the client device 106, install, remove, or disable certain applications, or install configuration profiles, such as VPN certificates, Wi-Fi profiles, email profiles, etc.

User data 127 represents information about users who have user accounts in the enterprise. These users can also have one or more client devices 106 that are enrolled as managed devices with the UEM service 120. User data 127 can include authentication data, and information about third party services with which the user is assigned an account.

The device data 129 can include a unique device identifier (UDID), as well as other device identifiers. The UDID can include an identifier assigned to a client device 106 at enrollment time, upon account creation, or another time. The UDID can alternatively be assigned by a manufacturer. In some cases, a device identifier can include a manufacturer serial number, or can be generated using the manufacturer's serial number as an input. In other cases, a device identifier can be generated in another manner that maintains a unique identity of a client device 106. The UDID can be stored in a device record in the device data 129. The device data 129 can also include a mapping that maps compliance policies 131 to the client device 106, including device encryption rules 132 for volumes 147 of the client device 106. The device data 129 can also identify user data 127 such as one or more users or user accounts that are associated with a particular client device 106. The device data 129 can also reference or include the compliance status 125 for a particular client device 106.

The device data 129 can also include a device update schedule and suspension limit data. These components and further aspects of secure volume encryption are described in U.S. application Ser. No. 17/316,346, filed on May 10, 2021 and entitled "SECURE VOLUME ENCRYPTION SUSPENSION FOR MANAGED CLIENT DEVICE UPDATES," which is incorporated herein by reference in its entirety. Additional aspects of secure volume encryption are described in U.S. application Ser. No. 17/316,294, filed on May 10, 2021 and entitled "SECURE RECOVERY KEY MANAGEMENT FOR REMOVABLE DRIVE ENCRYPTION ENFORCEMENT," which is incorporated herein by reference in its entirety.

The device encryption rules 132 for a client device 106 can specify, for each volume or drive 147 of the client device 106, volume encryption parameters including a recovery type, volume encryption method or algorithm, cipher strength or number of characters, and other parameters on a device wide basis or individually for each volume 147. The recovery type can include a recovery key identifier, recovery type and can specify that the recovery key identifier for each volume 147 can be written to an encrypted data location such as the UEM agent encrypted storage area, and can be associated with the client device 106. In some cases, a single recovery key and a single recovery key identifier can be used for multiple volumes or drives 147. In other cases, separate recovery keys corresponding to multiple volumes 147 can be identified using a single recovery key identifier. In yet further situations, separate recovery keys can be identified using separate recovery keys for the volumes 147. The UEM agent 145 can have access to the UEM agent encrypted storage area. The UEM agent 145 can also operate in a privileged mode under the system account so that users do not have access to the contents of the UEM agent encrypted storage area.

The volume encryption parameters can also specify that the drive recovery key be written to the UEM agent encrypted storage area. The UEM agent 145 can transmit a volume encryption command that causes the operating system 143, or other instructions, or applications executed on the client device 106 to encrypt one or more of the volumes 147 according to the device encryption rules 132. The volume encryption password can be entered or generated to conform to specified volume encryption parameters for the volumes 147.

The operating system 143 can include Windows® 10, which can utilize BitLocker® for volume encryption. The UEM agent 145 can transmit removable volume encryption data 135 in response to various events, periodically, and according to a schedule. The operating system 143 can also include Linux®, MacOS®, and other operating systems that utilize other volume encryption services. The client device 106 can also use other volume encryption services such as VeraCrypt® and TrueCrypt®. The compliance status 125 can identify which rules or policies a client device 106 or a user account linked to the client device 106 has violated. For example, the client device 106 may have been taken outside of a specified geofence defined for the client device 106. As another example, the client device 106 may have one or more unencrypted volumes 147. The compliance status 125 can identify compliance status information including compliance and violations of the compliance policies 131 and device encryption rules 132.

Fixed drive volumes 147 can include a fixed or client-device-specific memory connected through a bus of the client device 106, including an operating system volume 147a and non-operating-system volumes 147b. A fixed drive volume 147 can be client-device-specific and can be connected to an internal bus connection point of the client device 106 such that the fixed drive volume 147 is integrated with the client device 106. The fixed drive volume 147 can correspond to a drive type or classification of drives that is recognized by the operating system 143 as a fixed drive volume 147, rather than as a removable drive volume 147c.

For example, the fixed drives volumes 147 can include disk drives, solid state drives, flash drives, and other drives in a fixed drive format and arrangement. Both fixed and removable drive volumes 147 can be encrypted based on the device encryption rules 132.

The operating system 143 or another volume encryption service can obtain a volume encryption password, encrypt the volumes 147, and generate a drive recovery key that is uniquely associated with the fixed drive 147. However, the drive recovery key is not necessarily static, so a volume 147 that is re-encrypted is not limited to the same drive recovery key for each encryption event. A volume or drive recovery key can include a unique numerical, alphanumerical, or any character-based password that can be used to unlock access to one or more of the volumes 147 if the operating system 143 or its encryption instructions are unable to confirm that access is authorized. In one example, the drive recovery key can include a unique 48-digit numerical key. This drive recovery key can be saved as a file or printed when the standard encryption process of the operating system 143 is used. A recovery key identifier can be used in order to identify a drive recovery key. The recovery key identifier can include a unique numerical, alphanumerical, or any character-based password that can be mapped to the drive recovery key. For example, an 8 digit numerical key or a 32 digit alphanumerical key. The recovery key identifier can include or be generated using a hardware address of the volume 147. The operating system 143 or other volume encryption service can also support volume encryption suspension.

The UEM service 120 can enroll several client devices 106 for mobile device management services. To begin enrollment, the UEM service 120 can identify and authenticate one of the client devices 106 and store data related to the client device 106 for later reference. In some cases, the UEM service 120 (or a UEM agent 145, an application, or a component executing on the client device 106) can also be registered as a device administrator (at least in part) of the client device 106, permitting the UEM service 120 to configure and manage certain operating aspects of the client device 106.

Once the client device 106 is enrolled for device management by the UEM service 120, the UEM service 120 can direct the installation of various software components or applications on the client device 106. The software components can be configured on the client device 106 at the direction of the UEM service 120. Such software components can include, for example, applications, resources, libraries, and other related components.

The UEM agent 145 can also determine that a volume 147 is unencrypted by an operating-system-based or third party encryption software specified in the device encryption rules 132. The UEM agent 145 can enforce the device encryption rules 132 by directing encryption of the volume 147 using an operating-system-based encryption such as BitLocker® full volume encryption, VeraCrypt™, TrueCrypt™, or another volume encryption service.

The network services 107 can be embodied as one or more computers, computing devices, or computing systems. Like the cloud computing environment 103, the network service 107 can include one or more computing devices arranged, for example, in one or more server or computer banks. The computing device or devices can be located at a single installation site or distributed among different geographical locations. The network service 107 can include a plurality of computing devices that together embody a hosted computing resource, a grid computing resource, or other distributed computing arrangement. The network service 107 can also be embodied, in part, as certain functional or logical (e.g., computer-readable instructions) elements or modules as described herein.

The network services 107 can include first party and third party services provided by an enterprise to its users. A network service 107 can federate its authentication for users of the enterprise to the identity provider 118. A network service 107 can be a cloud-based storage service, recovery key escrow service, or another system for which the identity provider 118 can authenticate access by users of the enterprise. A network service 107 can be accessible over the Internet or another public WAN. For example, the UEM service 120 can use the identity provider 118 to authenticate with the network service 107 and can invoke an application programming interface (API) or a function of an API to store, modify, and retrieve removable drive recovery keys stored on a data store 110 of the network service 107.

A network service 107 can also include an intelligence service that analyzes data collected from the client devices 106 in order to identify security risks associated with the client devices 106. For example, the network service 107 can identify an anomaly between predetermined expected or acceptable behavior data, and actual behavior data received or otherwise identified from the client devices 106. If the behavior differences are identified as a security risk, the network service 107 can transmit a security event notification 171 to the UEM service 120. In some cases, the network service 107 can be considered part of the UEM service 120 such that the actions described for the network service 107 can be attributed to and performed by the UEM service 120. The UEM service 120 can identify the security risk and transmit a remedial action to the affected client device 106 according to the compliance policies 131.

The network service 107 or the UEM service 120 can analyze volume encryption data 135 aggregated from the volume encryption samples 134 of one or multiple client devices 106 to identify volume encryption security risks for more than an expected number of client devices 106. The UEM service 120 or the network service 107 can identify this as a security risk and can generate a security event and in the case of the network service 107, transmit a security event notification 171. The UEM service 120 can identify the security risk and transmit a remedial action command to the affected client device 106. For example, the UEM service 120 can place a command in the command queue maintained for an affected client device 106 and can utilize a push notification service to trigger each client device 106 to check in and retrieve the remedial action command.

In other examples, the UEM service 120 or the network service 107 can identify that another risk factor such as unencrypted removable drives 147c, unencrypted non-operating-system fixed drive volumes 147b, unencrypted operating system volumes 147a, a compromised or otherwise unauthorized encryption type is present in one or more of the client devices 106. The risk factor can also include encryption-specific risk factors that involve multiple volumes or all local volumes. The risk factor can also include a machine learned risk factor that includes encryption-specific and encryption agnostic components. For example, the security risk factor can be encryption-specific if the risk factor affects unencrypted volumes while encrypted volumes are not affected, or if the risk factor affects an unauthorized encryption type while the authorized encryption type is unaffected. The network service 107 can identify the security risk and can generate and transmit a security event notification 171 to the UEM service 120.

The UEM agent 145 can also have the authority to enable or disable certain hardware features of the client device 106 in certain instances. For example, the UEM agent 145 can communicate with the operating system of the client device 106 to disable access to the fixed drive 147 unless it is encrypted according to device encryption rules 132. The UEM agent 145 can also place the device into different hardware modes, such as airplane mode, silent mode, do-not-disturb mode, or other modes supported by the client device 106.

The UEM agent 145 can alter operation of the client device 106 in response to commands or policies provided by the UEM service 120 to the client device 106. The UEM agent 145, in one instance, can poll the UEM service 120, or a command queue associated with the UEM service 120, to determine whether a management command intended for the client device 106 has been sent to the client device 106. In response to the command queue having a command for a client device 106, the UEM agent 145 can retrieve the command and execute the command on the client device 106. The command might instruct the UEM agent 145 to install a configuration profile, enforce a restriction or policy, or take other management actions on the client device 106. In one example, the UEM service 120 might detect that the client device 106 is out of compliance with respect to a compliance rule and might instruct the UEM agent 145 to restrict a hardware feature of the client device 106, delete data from the client device 106, or disable certain applications on the client device 106. The UEM agent 145 can also take other variations of management actions on the client device 106 as directed by the UEM service 120.

As part of the enrollment process, the UEM service 120 and/or UEM agent 145 can be registered as a device administrator of the client device 106, permitting the UEM service 120 and/or UEM agent 145 to manage certain operating aspects of the client device 106. The UEM agent 145 can operate at a privileged level associated with a system account of the operating system 143. The UEM service 120 can remotely configure the client device 106 by interacting with the UEM agent 145. The UEM service 120 can also transfer various software components to the client device 106, and those software components can be installed and/or configured on the client device 106 at the direction of the UEM agent 145. Such software components can include, for example, applications, resources, libraries, drivers, device configurations, or other related components. The UEM service 120 can also transfer various management policies, compliance rules, and configuration data for enforcement on the client device 106, and those policies, rules, and data can be stored on the client device 106 by the UEM agent 145 The UEM service 120 can then instruct the UEM agent 145 and the operating system of the client device 106 to enforce the management policies, compliance rules, and configuration data stored on the client device 106.

FIG. 2 shows an example of device encryption rules 132 and an example of volume encryption samples 134. The device encryption rules 132 can include a set of one or more rules applicable to multiple volumes or comprehensive to all detected local volumes or all detected local fixed drive volumes. This can include rules applicable to system volumes and non-system volumes. By contrast, existing technologies can be limited to the system drive, and do not consider multiple volumes or all local volumes, and do not consider non-system volumes for fixed and removable drive volumes. The volume encryption sample 134 can include device configuration and status information for non-system volumes, multiple volumes, and all detected local volumes in various embodiments. This can include device configuration and status information for system volumes and non-system volumes. The volume encryption sample 134 can be transmitted to the UEM service 120 including, or along with an indication of compliance or violation of device encryption rules 132.

The UEM service 120 and the UEM agent 145 can each analyze multiple-volume and comprehensive volume information included in the volume encryption samples 134 to enforce device encryption rules 132. This can include identifying remedial actions based on the multiple-volume and comprehensive volume information. The device encryption rules 132 can include system volume encryption rules 203, non-system volume encryption rules 206, removable drive encryption rules 209, as well as multiple-volume and comprehensive volume encryption rules 212. The device encryption rules 132 can be referred to as comprehensive by referring to encryption rules applicable to all detected local volumes 147 of a client device 106 even if this is achieved by using multiple different rules, rather than a single rule that is all-encompassing or unitary. The device encryption rules 132 can be referred to as multiple-volume by referring to encryption rules applicable to multiple volumes 147 of a client device 106, rather than existing technologies that are only applicable to an operating system volume 147a. The device encryption rules 132 can be referred to as multiple-volume even if indicated using multiple different rules rather than a single rule that is all-encompassing or unitary for multiple volumes 147.

The system volume encryption rules 203 can include rules that are specific to or otherwise applicable to the operating system volume 147a. The system volume encryption rules 203 can specify that an operating system volume 147a be encrypted. The system volume encryption rules 203 can also provide a number of bits for the encryption, which can be agnostic as to the encryption type, such as Advanced Encryption Standard (AES) or exclusive or encrypt exclusive or (XEX)-based tweaked-codebook mode with ciphertext stealing (XTS)-AES. For example, the system volume encryption rules 203 can specify 128-bit encryption (any encryption standard and any cipher block type), 192-bit encryption, 256-bit encryption, and so on. The encryption type can refer to the overall encryption method including the encryption standard and cipher block type.

For example, a specific encryption type can include AES-128, XTS-AES128, AES192, XTS-AES192, AES256, XTS-AES256, and so on. The system volume encryption rules 203 can also specify a preferred encryption type as well as acceptable encryption types that still constitute a violation but do not result in a remedial action that causes reconfiguration or restriction of the client device 106. A remedial action such as a transmission of a notification can still occur. A preferred encryption type can be XTS-AES256, while acceptable encryption types can include 192-bit encryption or better, such as AES192, XTS-AES192, AES256, and XTS-AES256. In another example, the system volume encryption rules 203 can specify the preferred encryption type as XTS-AES256, and any XTS cipher block encrypted encryption type 192-bit or greater is also acceptable. The system volume encryption rules 203 can also indicate remedial actions for a violation that is detected and identified as unacceptable. For example, the system volume encryption rules 203 can specify that if the operating system volume 147a is unencrypted, the UEM agent 145 can automatically encrypt the operating system volume 147a using a specified set of encryption settings and a particular encryption type. The UEM service 120 can generate a ranking of encryption policies according to order of effectiveness or preference. The UEM service 120 can also indicate that any encryption type indicated as lower or less effective in the ranking than a specified encryption type is unacceptable.

The non-system volume encryption rules 206 can include rules that are specific to or otherwise applicable to non-operating-system fixed drive volumes 147b. The non-system volume encryption rules 206 can specify that non-operating-system fixed drive volumes 147b be encrypted. The non-system volume encryption rules 206 can also provide a number of bits for the encryption, which can be agnostic as to the encryption type. For example, the non-system volume encryption rules 206 can specify 128-bit encryption (any encryption standard and any cipher block type), 192-bit encryption, 256-bit encryption, and so on. The encryption type can refer to the overall encryption method including the encryption standard and cipher block type.

The non-system volume encryption rules 206 can also specify a preferred encryption type as well as acceptable encryption types that still constitute a violation but do not result in a remedial action that causes reconfiguration or restriction of the client device 106. A remedial action such as a transmission of a notification can still occur. A preferred encryption type can be XTS-AES192, while acceptable encryption types can include 192-bit encryption or better, such as AES192, XTS-AES192, AES256, and XTS-AES256. In another example, the non-system volume encryption rules 206 can specify the preferred encryption type as XTS-AES192, and any XTS cipher block encrypted encryption type 192-bit or greater is acceptable. The non-system volume encryption rules 206 can also indicate remedial actions for a violation that is detected and identified as unacceptable. For example, the non-system volume encryption rules 206 can specify that if a non-operating-system volume 147b is unencrypted, the UEM agent 145 can automatically encrypt it using a specified set of encryption settings and a particular encryption type.

The removable drive encryption rules 209 can include rules that are specific to or otherwise applicable to removable drive volumes 147c. The removable drive encryption rules 209 can specify that removable drive volumes 147c be encrypted. The removable drive encryption rules 209 can also provide a number of bits for the encryption, which can be agnostic as to the encryption type. For example, the removable drive encryption rules 209 can specify 128-bit encryption (any encryption standard and any cipher block type), 192-bit encryption, 256-bit encryption, and so on. The encryption type can refer to the overall encryption method including the encryption standard and cipher block type.

The removable drive encryption rules 209 can also specify a preferred encryption type as well as acceptable encryption types that still constitute a violation but do not result in a remedial action that causes reconfiguration or restriction of the client device 106. A remedial action such as a transmission of a notification can still occur. A preferred encryption type can be XTS-AES192, while acceptable encryption types can include 192-bit encryption or better, such as AES192, XTS-AES192, AES256, and XTS-AES256. In another example, the removable drive encryption rules 209 can specify the preferred encryption type as XTS-AES192, and any XTS cipher block encrypted encryption type 192-bit or greater is acceptable. The removable drive encryption rules 209 can also indicate remedial actions for a violation that is detected and identified as unacceptable. For example, the removable drive encryption rules 209 can specify that if a non-operating-system volume 147b is unencrypted, the UEM agent 145 can automatically encrypt it using a specified set of encryption settings and a particular encryption type.

The multiple-volume and comprehensive volume encryption rules 212 can include encryption rules that apply generally to all volumes on the client device 106, or all volumes that do not correspond to other rules specified using more specifically tailored system volume encryption rules 203, non-system volume encryption rules 206, and removable drive encryption rules 209. The multiple-volume and comprehensive volume encryption rules 212 can specify that all volumes 147 be encrypted. The multiple-volume and comprehensive volume encryption rules 212 can also provide a number of bits for the encryption, which can be agnostic as to the encryption type. For example, the multiple-volume and comprehensive volume encryption rules 212 can specify 128-bit encryption (any encryption standard and any cipher block type), 192-bit encryption, 256-bit encryption, and so on. The encryption type can refer to the overall encryption method including the encryption standard and cipher block type.

The multiple-volume and comprehensive volume encryption rules 212 can also specify a preferred encryption type as well as acceptable encryption types that still constitute a violation but do not result in a remedial action that causes reconfiguration or restriction of the client device 106. A remedial action such as a transmission of a notification can still occur. A preferred encryption type can be XTS-AES256, while acceptable encryption types can include 192-bit encryption or better, such as AES192, XTS-AES192, AES256, and XTS-AES256. In another example, the multiple-volume and comprehensive volume encryption rules 212 can specify the preferred encryption type as XTS-AES256, but any encryption type is acceptable. The multiple-volume and comprehensive volume encryption rules 212 can also indicate remedial actions for a violation that is detected and identified as unacceptable. For example, the multiple-volume and comprehensive volume encryption rules 212 can specify that if a volume 147 is unencrypted, the UEM agent 145 can automatically encrypt it using a specified set of encryption settings and a particular encryption type. While specific rules are described with reference to a particular volume type, the rules can also apply to other volume types.

The volume encryption sample 134 can include a data structure generated or constructed by the UEM agent 145 and transmitted to the UEM service 120 and the network service 107. The UEM service 120 can store, in the volume encryption data 135, the received volume encryption samples 134. The UEM service 120 can receive volume encryption samples 134 for multiple client devices 106 so that it can be aggregated and analyzed on a device level or per-device basis, on an enterprise deployment level or across all client devices 196, and on a group level for a logical grouping of client devices 106. The logical grouping can include a device group or user group corresponding to client devices 106 for a particular user, a particular department, a particular device type, or another logical grouping. The volume encryption sample 134 can include any data structure such as a JavaScript Object Notation (JSON) data structure, a Yet Another Multicolumn Layout (YAML) data structure, another human-readable data-serialization language data structure, Binary JSON (BSON) data structure or another machine-readable data form or encoded version of a human-readable data-serialization language, Extensible Markup Language (XML) data structure, a Protobuf data structure or another language-neutral, platform-neutral, extensible data-serialization language data structure.

The volume encryption sample 134 can include a device identifier 215, a system volume encryption status 218, a system volume encryption type 221, a system volume encryption adequacy flag or indicator 224, a recovery key stored indicator 227, one or more recovery keys 230, one or more corresponding recovery key lengths 233, a device summary encryption status 236, volume-specific encryption data 239, encryption completion level, a manufacturer specific data protection status, and a set of enabled users 249. Enabled users 249 can include identifiers for user accounts that are enabled to access the client device 106, or a particular volume 147 on the client device 106.

The device identifier 215 can include a unique device identifier UDID for the client device 106, a manufacturer-supplied serial number, a name or user-friendly name of the client device 106, and other information. The device identifier 215 can be used for data aggregation, identification, and separation purposes.

The system volume encryption status 218 can include an encryption status that describes and is specific to the operating system volume 147a. The system volume encryption type 221 can indicate an encryption type that describes and is specific to the operating system volume 147a. The system volume encryption adequacy indicator 224 can include a flag or other data that indicates whether the system volume encryption type 221 matches a preferred encryption type specified in system volume encryption rules or multiple-volume and comprehensive volume encryption rules of the device encryption rules 132. In some examples, a system volume encryption adequacy indicator 224 can indicate that an encryption type for the referenced volume 147 is inadequate or lower than the preferred encryption type in a ranking generated by the UEM service 120. The UEM agent 145 can identify parallel information for all volumes 147, for inclusion in the volume-specific encryption data 239.

The recovery key stored indicator 227 can indicate that the recovery key 230 is stored, for example, in a cloud-based recovery key escrow of the UEM service 120. The recovery keys 230 can include a recovery key 230, for example, for one or more volume 147 that is newly encrypted or is not yet stored in a cloud-based recovery key escrow of the UEM service 120. In some cases, no recovery key 230 is included. A single recovery key 230 can be used for a single volume 147, or for multiple volumes 147 as discussed. The recovery key lengths 233 can include key lengths corresponding to each recovery key 230 that is included in the volume encryption sample 134.

The device summary encryption status 236 can include one or more encryption statuses that refer to an aggregate state in consideration of device wide or multiple-volume encryption information identified for the client device 106. A device summary encryption status 236 can indicate one or more encryption status values for the client device 106. For example, the device summary encryption status 236 can indicate one or more status values indicating that all volumes 147 or drives are encrypted, that any volume 147 is suspended, that volume encryption is in progress for any one or more volume 147, that volume decryption is in progress for any one or more volume 147, that any one or more volume 147 suspension is scheduled, that the operating system volume 147a suspension is scheduled, that any one or more volume 147 is partially protected by encryption using a non-preferred encryption type, that the operating system volume 147a is partially protected by encryption using a non-preferred encryption type, and that all detected volumes 147 are unencrypted.

In some cases, a single value can be identified for the device summary encryption status 236, which can be used as a net encryption status for the client device 106. For example, the UEM agent 145 can assess the potential statuses or a subset of the potential status values for the device summary encryption status 236 are evaluated in a specific order, and the first status value that evaluates as true on the client device 106 can be written as the device summary encryption status 236 in the volume encryption sample 134.

Volume-specific encryption data 239 can specify a set of information for each volume 147 that is detected on the client device 106. For example, the UEM agent 145 can query the operating system 143 to identify a list of volumes 147. The UEM agent 145 can then query the operating system 143 or third party encryption instructions for the set of information for each volume 147 concurrently, simultaneously, or with partial concurrence until all of the volume-specific encryption data 239 is identified. The UEM agent 145 can use the volume-specific encryption data 239 to generate status values for the system volume encryption status 218, the system volume encryption type 221, the system volume encryption adequacy indicator 224, the recovery key stored indicator 227, the recovery keys 230, the recovery key lengths 233, the device summary encryption status 236, the encryption completion level, and a manufacturer specific data protection status. The UEM agent 145 can query the operating system 143 to identify registry keys and other values for volume-specific encryption data 239. The UEM agent 145 can query a manufacturer-provided application to identify a manufacturer-specific data protection status such as a DELL® Dell Data Protection Encryption (DDPE) status. Alternatively, the UEM agent 145 can search a predetermined data location of the client device 106 in order to identify a particular value for the volume-specific encryption data 239.

In the example of a volume 147 encrypted using a WINDOWS® operating system 143, the UEM agent 145 can invoke Windows Management Instrumentation (WMI) queries to identify volume-specific encryption data 239. However, other operating systems 143 can also be queried using operating system specific queries for the volume-specific encryption data 239.

The WMI queries can identify a conversion status corresponding to whether a volume 147 is fully encrypted, used space only encrypted, fully decrypted, if encryption is in progress, and what the progress percentage is for encryption in progress. For example, a WMI query:(Get-WmiObject-Namespace "root/CIMV2/Security/Microsoft VolumeEncryption"-Class Win32_EncryptableVolume).GetConversionStatus( )" can return results that can be transformed according to Table 1:

TABLE 1

| WMI Conversion Status | WMI Encryption Flags | UEM Drive Conversion Status for volume-specific encryption data 239 |
|---|---|---|
| 0 | Any | Fully Decrypted |
| 1 | 0 | Used Space Only Encrypted |
| 1 | Non Zero | Fully Encrypted |
| 2 | Any | Encryption in Progress |

Other operating systems 143 and non-operating-system encryption services can also be queried for this information with the results being transformed into a format that is used for the volume-specific encryption data 239.

The UEM agent 145 can also identify suspension statuses for the volume-specific encryption data 239. For example, the following can be evaluated as False or not True: (Get-WmiObject-Namespace "root/CIMV2/Security/Microsoft-VolumeEncryption"-Class Win32_EncryptableVolume). GetProtectionStatus( ).ProtectionStatus-eq 1. AND (UEM drive conversion status is either 'Fully encrypted' OR UEM drive conversion status is 'Used space only encrypted'). Suspended status can be 'Scheduled Suspended Status' if volume or drive is suspended by the UEM service 120 or other management service.

Figure 3:
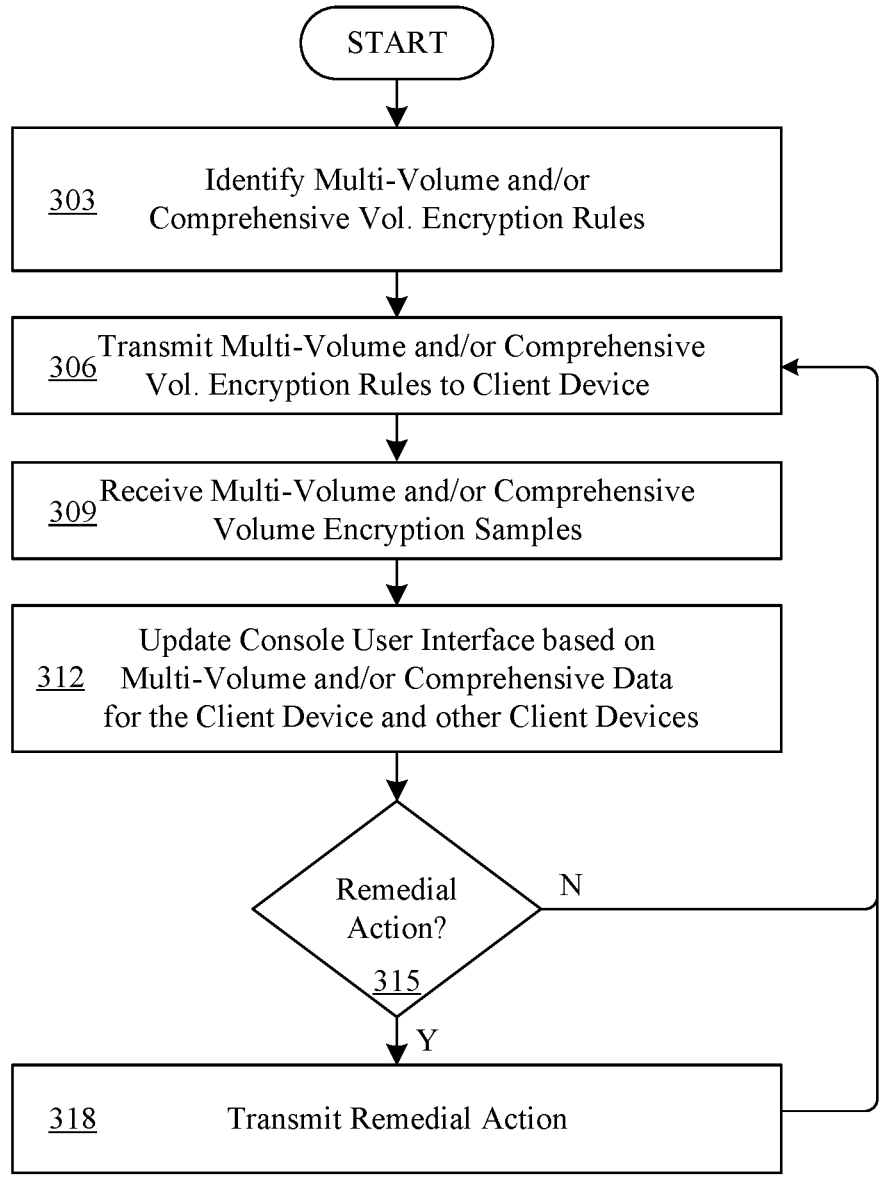
FIG. 3 illustrates a flowchart performed by components of the networked environment for data-at-rest security for managed client devices, according to various examples described herein.

FIG. 3 shows a flowchart performed by components of the networked environment 100. The flowchart illustrates how a UEM service 120 can interact with other components of the networked environment 100 to provide data-at-rest security for managed client devices 106. Generally, the flowchart shows how the UEM service 120 provides multiple-volume and comprehensive device encryption rules 132 to client devices 106, receives multiple-volume and comprehensive volume encryption samples 134, and uses this information for remedial actions and administrative console updates. While the steps are discussed as being performed by the UEM service 120, other components of the networked environment 100 can also perform the steps and certain aspects of the flowchart.

In step 303, the UEM service 120 can identify device encryption rules 132 for the client device 106. The device encryption rules 132 can include multiple-volume rules and comprehensive volume rules. The UEM service 120 can generate a console user interface through which an administrator can specify the device encryption rules 132. For example, the console user interface can include a user interface element that enables a user to select rules that individually or on aggregate are applicable to multiple volumes 147 of the client device 106, or all local volumes detected by a UEM agent 145.

In step 306, the UEM service 120 can transmit the device encryption rules 132 to a client device 106. For example, the UEM service 120 can maintain a command queue for the client device 106. The UEM service 120 can place a command to enforce the device encryption rules 132 in the command queue. The UEM agent 145 can check in with the UEM service 120 and retrieve the command and the device encryption rules 132 from the command queue. In some examples, the command includes a link or URL that specifies a network location from which the device encryption rules 132 can be downloaded.

In step 309, the UEM service 120 can receive volume encryption samples 134 from the client device 106. The UEM agent 145 can generate and transmit the volume encryption samples 134 according to a schedule or predetermined schema, and in response to detection of violations or other device states of the client device 106. The volume encryption samples 134 can include multiple volume and comprehensive volume encryption samples 134 as discussed with respect to FIG. 2.

In step 312, the UEM service 120 can update the console user interface based on the multiple volume and comprehensive volume encryption samples 134. The UEM service 120 can receive the volume encryption samples 134 including, or along with an indication of compliance or violation of device encryption rules 132. Alternatively, the UEM service 120 can evaluate compliance or violation of device encryption rules 132 using the volume encryption samples 134. The UEM service 120 can update the console user interface to indicate the compliance or violation of the client device 106 individually, or as updated aggregate numbers of client devices 106 in compliance with device encryption rules 132 and in violation of device encryption rules 132.

The UEM service 120 can indicate compliance and violations at the device level, or based on whether a client device 106 is in compliance with all rules, or is in violation of at least one rule. The UEM service 120 can indicate compliance and violations at a rule level, indicating whether a specific aspect of the device encryption rules 132 is in compliance or violation. For example, the UEM service 120 can indicate compliance and violation for aspects of system volume encryption rules 203, non-system volume encryption rules 206, removable drive encryption rules 209, and multiple-volume and comprehensive volume encryption rules 212. This can also include compliance and violation of a system volume encryption status 218, system volume encryption type 221, a device summary encryption status 236, as well as statuses and aspects of the volume-specific encryption data 239.

In step 315, the UEM service 120 can determine whether a remedial action is to be performed. While the UEM agent 145 can perform remedial actions automatically, in other cases the remedial action can be first authorized by an administrator or other user through the console user interface of the UEM service 120. For example, the UEM service 120 can generate a notification on a dashboard or other user interface area. The notification can cause the console user interface to indicate a violation as well as an indicator of the client device 106, the specific device encryption rule 132 that is violated, a user account associated with the client device 106, and a remedial action. In some cases, a list of remedial actions can be shown in the console user interface, and a user can select a remedial action to perform. If a remedial action is to be performed, the process can move to step 318.

In step 318, the UEM service 120 can transmit a command for the UEM agent 145 to perform a remedial action. For example, the UEM service 120 can place a command in the command queue along with instructions or a URL that specifies a network location for instructions for the UEM agent 145 to perform the remedial action.

The remedial action can include locking the client device 106 such that it is inoperable, performing an enterprise wipe such as removal of enterprise data from the client device 106, revoking access to remote enterprise data, unenrollment of the client device 106, automatic reconfiguration of the client device 106 such that it is in compliance with the device encryption rules 132, and so on. Reconfiguration can include updating encryption to full volume encryption from used space encryption, encryption of unencrypted operating system volumes 147a, encryption of unencrypted non-operating-system volumes 147b, encryption of unencrypted removable volumes 147c, as well as decryption and re-encryption of all or a specified type of encrypted volumes 147 that are identified to have insufficient encryption.

Figure 4:
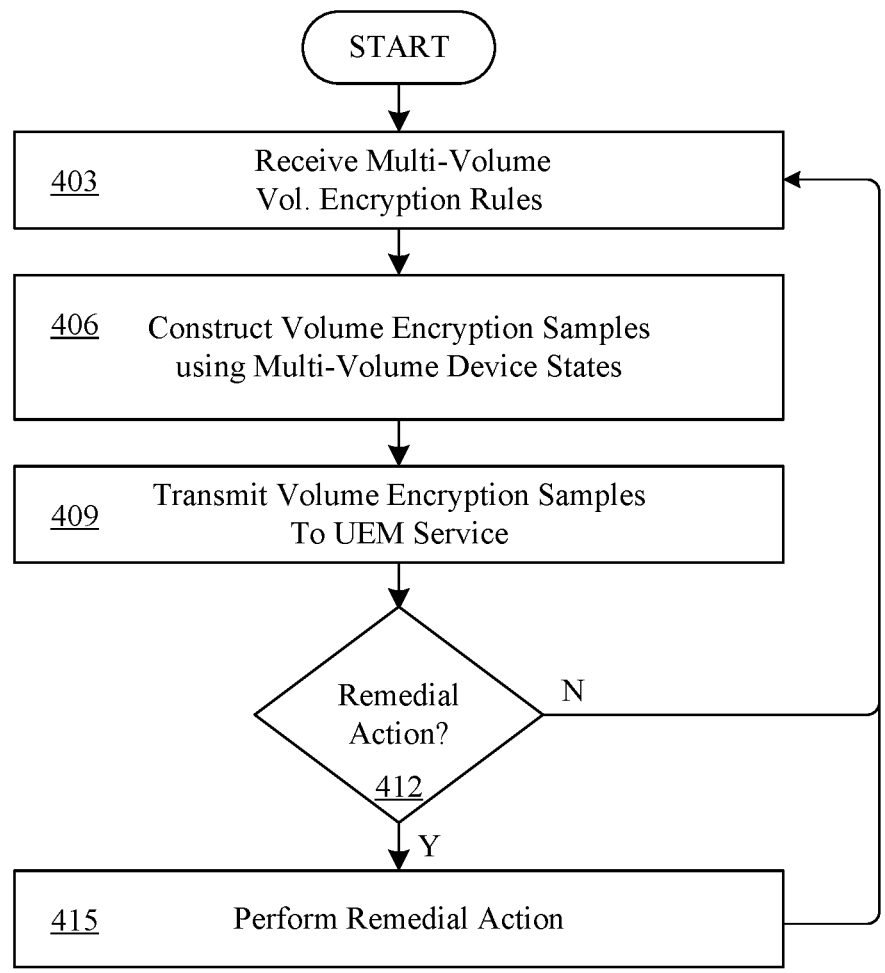
FIG. 4 illustrates another flowchart performed by components of the networked environment for data-at-rest security for managed client devices, according to various examples described herein.

FIG. 4 shows a flowchart performed by components of the networked environment 100. The flowchart illustrates how a UEM agent 145 can interact with other components of the networked environment 100 to provide data-at-rest security for managed client devices 106. Generally, the flowchart shows how the UEM agent 145 receives multiple-volume and comprehensive device encryption rules 132, generates multiple-volume and comprehensive volume encryption samples 134, and enforces the device encryption rules 132. While the steps are discussed as being performed by the UEM agent 145, other components of the networked environment 100 can also perform the steps and certain aspects of the flowchart.

In step 403, the UEM agent 145 can receive device encryption rules 132 for the client device 106. The device encryption rules 132 can include multiple-volume rules and comprehensive volume rules. The UEM agent 145 can check in with the UEM service 120 and retrieve, from the command queue, a command that includes or identifies a location of the device encryption rules 132. The command can include a link or URL that specifies a network location from which the device encryption rules 132 can be downloaded.

In step 406, the UEM agent 145 can construct volume encryption samples 134. In some cases, the information detected and collected for inclusion in the volume encryption samples 134 can be identified in the device encryption rules 132. The UEM agent 145 can generate queries and transmit them to the operating system 143, to an encryption application, or to another application executed on the client device 106. The queried application or operating system 143 can return volume encryption information. The UEM agent 145 can also read a particular data location of a data store of the client device 106 to identify additional information. The UEM agent 145 can use this information as an input to construct or generate the volume encryption samples 134.

In step 409, the UEM agent 145 can transmit the volume encryption samples 134 to the UEM service 120. The UEM agent 145 can reference a schedule or other predetermined schema such as a transmission frequency or period and can transmit the volume encryption samples 134 according to the predetermined schema. The UEM agent 145 can also evaluate compliance and violation of the device encryption rules 132 based on the volume encryption samples 134 and the multiple-volume and comprehensive device states used to generate the volume encryption samples 134. In some cases, the UEM agent 145 can transmit the volume encryption samples 134 in response to a detected violation of device encryption rules 132.

In step 412, the UEM agent 145 can determine whether a remedial action is to be automatically performed on the client device 106. The UEM agent 145 can evaluate compliance and violation of the device encryption rules 132 based on the volume encryption samples 134 and the multiple-volume and comprehensive device states used to generate the volume encryption samples 134. The device encryption rules 132 can indicate that certain violations are mapped to an automatic remedial action performed by the UEM agent 145. If the UEM agent identifies an automatic remedial action to be performed, the process can move to step 415.

The UEM agent 145 can alternatively receive a command to perform a remedial action from the UEM service 120. For example, the UEM service 120 can analyze the volume encryption samples 134 in view of the device encryption rules 132 and return a remedial action to perform. An administrator or other user can also confirm that a remedial action is to be performed, for example, by selection of a user interface element of a console user interface of the UEM service 120. The UEM agent 145 can retrieve, from a command queue maintained for the client device 106 by the UEM service 120, a command to perform the remedial action. The command can identify instructions for the UEM agent 145 to perform the remedial action. If the UEM agent 145 receives a remedial action, the process can move to step 415.

In step 415, The UEM agent can perform the remedial action. The remedial action can include locking the client device 106 such that it is inoperable, performing an enterprise wipe such as removal of enterprise data from the client device 106, revoking access to remote enterprise data, unenrollment of the client device 106, automatic reconfiguration of the client device 106 such that it is in compliance with the device encryption rules 132, and so on. Reconfiguration can include updating encryption to full volume encryption from used space encryption, encryption of unencrypted operating system volumes 147a, encryption of unencrypted non-operating-system volumes 147b, encryption of unencrypted removable volumes 147c, as well as decryption and re-encryption of all or a specified type of encrypted volumes 147 that are identified to have insufficient encryption.

FIG. 5 shows an example management console of the UEM service 120. The console user interface can include a device encryption configuration user interface area 503. The device encryption configuration user interface area 503 can include a number of user interface elements that a user can manipulate in order to design or specify device encryption rules 132.

A user interface element 506 can enable an administrative user or another user to specify encryption for a specified set of volumes for a client device 106. For example, the user interface element 506 can include a menu or list that specifies to encrypt a selected one of: the volumes 147 or all detected fixed drive volumes including the operating system volume 147a and all non-operating-system fixed drive volumes 147b. The user interface element 506 can also indicate to encrypt all detected local volumes, including the operating system volume 147a, all non-operating-system fixed drive volumes 147b, and all removable drive volumes 147c.

A user interface element 509 can enable an administrative user or another user to specify an encryption type. For example, the user interface element 509 can include a menu or list that specifies a list of encryption types, which can indicate options that include any of the encryption types discussed. A user interface element 512 can enable an administrative user or another user to specify to only encrypt used space during initial encryption. In some cases, the user interface element can also cause the client device 106 to update used space encryption to full disk encryption at a specified time, for example, a time that is not during business hours, or when the client device 106 is idle, or other times.

A user interface element 515 can enable an administrative user or another user to specify or enter a customized URL for recovery. This can include a URL for a website of a network service 107 or the UEM service 120 for self-service volume recovery.

A user interface element 518 can enable an administrative user or another user to force encryption on the client device 106. For example, if the encryption is not performed, an automatic remedial action including automatic encryption of the unencrypted volumes 147 and any of the other remedial actions discussed.

A user interface element 521 can enable an administrative user or another user to specify or select recovery key actions such as using a same recovery key for all drives or volumes 147, or separate recovery keys for each drive or volume 147.

A user interface element 524 can enable an administrative user or another user to specify an authentication mode such as trusted platform module (TPM) authentication, password authentication, external authentication device (e.g., smart card), and others.

A user interface element 527 can enable an administrative user or another user to specify a PIN or user-entered code.

This can be used in addition to TPM authentication. A user interface element 530 can enable an administrative user or another user to specify a PIN length indicating a number of characters for the user-entered code. A user interface element or elements 533 can enable an administrative user or another user to specify use of an enhanced PIN or enhanced user entered code that is enhanced to include at least one type of non-numeric character such as an alphanumeric, or alphanumeric plus an indicated set of special characters.

A user interface element 539 can enable an administrative user or another user to specify to allow the use of a password if TPM is not available or detected on the client device 106 by the UEM agent 145. A user interface element 542 can enable an administrative user or another user to specify to suspend encryption until a TPM of the client device 106 is initialized.

Figure 6:
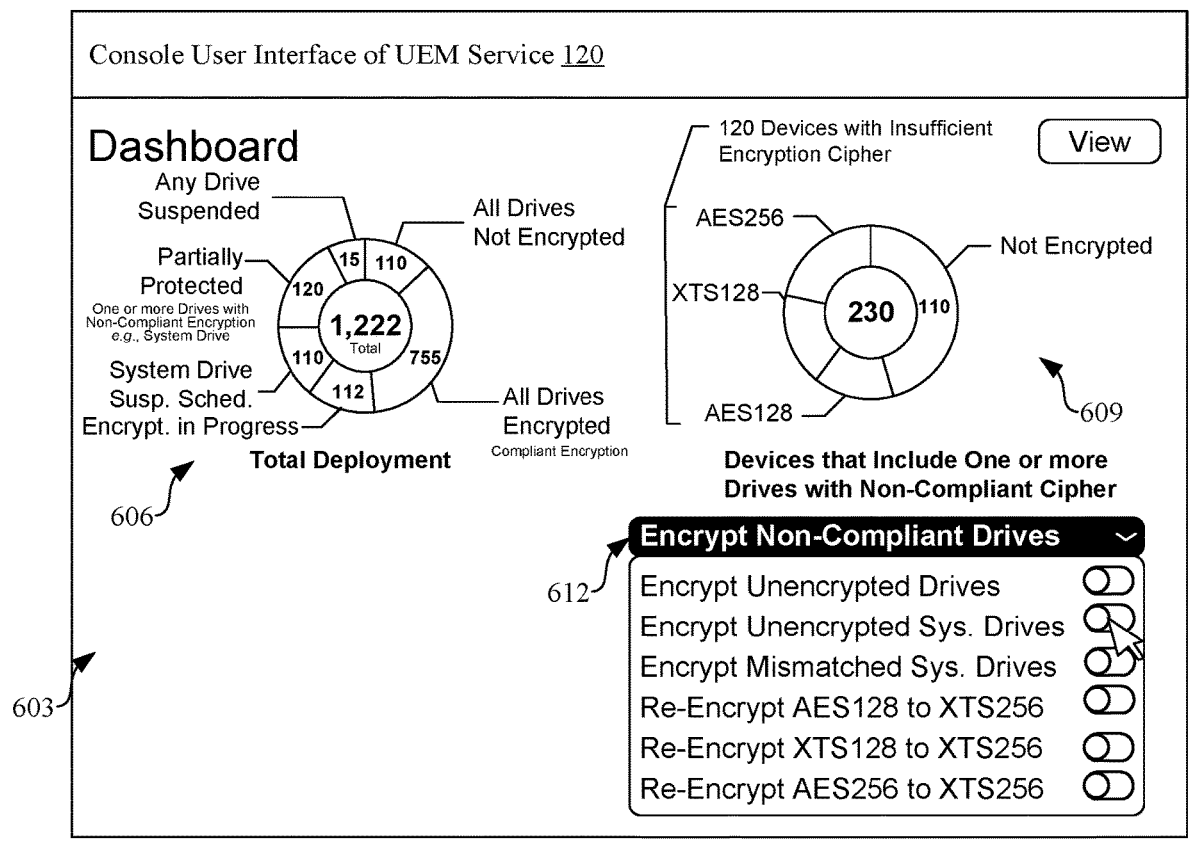
FIG. 6 illustrates another example user interface for data-at-rest security for managed client devices, according to various examples described herein.

FIG. 6 shows another example of the management console of the UEM service 120. The management console can include a dashboard user interface area 603 that provides aggregated information about device multi-volume and comprehensive volume encryption for a deployment of multiple client devices 106.

The dashboard user interface area 603 can include a user interface element 606. The user interface element 606 can provide a graph such as a pie chart, bar chart, line chart, or another graphical representation of compliance status information, which shows a total number of client devices 106, as well as a graphical representation and number or percentage of client devices 106 that correspond to a number of categories of multi-volume and comprehensive volume encryption. For example, categories can include the number or percentage of client devices 106 with any drive suspended; the number or percentage of client devices 106 with all drives unencrypted; the number or percentage of client devices 106 with all drives encrypted using compliant encryption or encryption equal to or greater than a specified encryption type; the number or percentage of client devices 106 with encryption in progress; the number or percentage of client devices 106 that have system drive or operating system volume 147a suspension scheduled, or scheduled within a predetermined time window; and the number or percentage of client devices 106 that are partially protected, or encrypted using insufficient encryption that is lesser than a specified encryption type.

The dashboard user interface area 603 can include a user interface element 609 that provides an aggregated view of non-compliant client devices 106 according to the reason for non-compliance with the device encryption rules 132 for the client devices 106. For example, device encryption rules 132 can specify XTS256 (or XTS-AES256) encryption. The UEM service 120 can determine that unencrypted client devices 106 and those encrypted using other encryption types are non-compliant. The user interface element 609 can show a graphical representation and a number or percentage of client devices 106 that are: unencrypted, AES128 encrypted, AES256 encrypted, and XTS128 encrypted, and so on. AES128 encrypted, AES256 encrypted, and XTS128 encrypted can be insufficient encryption types because they are listed lower on a ranked list of encryption types maintained by the UEM service 120. The user interface area 603 can also indicate a number or percentage of client devices 106 that are encrypted using an insufficient encryption type. The user interface area 603 can also include a user interface element that when selected shows additional details including UDIDs, associated user accounts, and other information for the client devices 106 that are encrypted using an insufficient encryption type.

The dashboard user interface area 603 can include a user interface element 612 that enables an administrator to encrypt or re-encrypt a selected subset of client devices 106 that are non-compliant with device encryption rules 132. The user interface element 612 or dashboard user interface area 603 can also include selectors for specified subsets of the client devices 106 including those shown in the user interface element 609 and the user interface element 612. Re-encryption of currently encrypted client devices 106 can require volume encryption suspension.

FIG. 7 shows another example of the management console of the UEM service 120. The management console can include a user interface area 703 that provides compliance information about a particular client device 106. The user interface area 706 can include compliance information regarding compliance with compliance policies 131 including device encryption rules 132. The user interface area 706 can provide a graphical indication such as an approval icon or a symbol indicating that the client device 106 for "Developer1" is managed by the UEM service 120. The approval icon or symbol can also be used to indicate that the client device 106 is associated with use of a specified firewall, has an updated operating system 143 and operating system updates enabled, and complies with other ones of the compliance policies 131 and device encryption rules 132. The user interface area 706 can provide a graphical indication such as a warning icon or symbol indicating that system volume encryption of the client device 106 is on but partially protected, that the client device 106 includes non-operating-system fixed drive volumes 147b, and that the client device 106 includes unencrypted removable drive volumes 147c. Additional information can also be shown.

A user interface area 703 can indicate more detailed multi-volume and comprehensive volume encryption information for the client device 106. A user interface area 712 can indicate information regarding the operating system volume 147a, and a link or user interface element that enables an administrative user or another user to view a recovery key for the operating system volume 147a. A user interface area 715 can indicate information regarding the non-operating-system volumes 147b, and a link or user interface element that enables an administrative user or another user to view a recovery key for non-operating-system volumes 147b that are encrypted. A user interface area 718 can indicate information regarding the removable drive volumes 147c, and a link or user interface element that enables an administrative user or another user to view a recovery key for any encrypted removable drive volumes 147c.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The cloud computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the UEM service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The UEM service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the UEM service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method, comprising:
identifying, by a management service executed in a cloud computing environment, encryption rules for a plurality of local volumes of a client device, the plurality of local volumes comprising at least one operating system volume and at least one non-operating-system volume and the encryption rules including a first portion that specifies encryption parameters and a second portion that specifies information to include in encryption samples;
transmitting, by the management service to the client device, the encryption rules for the plurality of local volumes of the client device;
wherein the client device:
  encrypts the at least one operating system volume according to and using the transmitted encryption parameters,
  identifies the transmitted specified information,
  collects at least one volume encryption sample from the encrypted at least one operating system volume according to the identified specified information, and
  sends the collected at least one volume encryption sample to the management service;
receiving, by the management service from the client device, the sent at least one volume encryption sample, the received at least one encryption sample comprising: at least one volume encryption status generated based on a plurality of encryption states for the at least one operating system volume and the at least one non-operating-system volume;
determining compliance by the management service, by examining the received at least one encryption sample and checking if the received at least one encryption sample is encrypted according to the transmitted first portion of the encryption rules; and
generating, by the management service, a console user interface that indicates compliance status information according to the determined compliance for the at least one operating system volume and the at least one non-operating-system volume.

2. The method according to claim 1, wherein the console user interface comprises a notification that identifies a violation of at least one of the encryption rules and a recommended remedial action.

3. The method according to claim 1, wherein the encryption rules comprise: operating system volume encryption rules, non-operating-system volume encryption rules, and removable drive encryption rules.

4. The method according to claim 1, wherein the encryption rules comprise at least one multiple-volume encryption rule that applies to a plurality of local drive volumes of the client device.

5. The method according to claim 1, wherein the at least one volume encryption sample comprises: a unique device identifier of the client device, an operating system volume encryption status, an operating system volume encryption type, and an indication of system volume encryption adequacy with respect to an encryption type specified in the encryption rules for the client device.

6. The method according to claim 5, wherein the at least one volume encryption sample further comprises volume-specific encryption data for a plurality of local volumes comprising at least one non-operating-system fixed drive volume.

7. The method according to claim 6, wherein the plurality of local volumes of the client device comprise: at least one removable drive volume.

8. A non-transitory computer-readable medium embodying instructions executable by at least one computing device, the instructions, when executed, causing the at least one computing device to at least:
identify, by a management service executed in a cloud computing environment, encryption rules for a plurality of local volumes of a client device, the plurality of local volumes comprising at least one operating system volume and at least one non-operating-system volume and the encryption rules including a first portion that specifies encryption parameters and a second portion that specifies information to include in encryption samples;
transmit, by the management service to the client device, the encryption rules for the plurality of local volumes of the client device;
wherein the client device:
encrypts the at least one operating system volume according to and using the transmitted encryption parameters,
identifies the transmitted specified information,
collects at least one volume encryption sample from the encrypted at least one operating system volume according to the identified specified information, and
sends the collected at least one volume encryption sample to the management service;
receive, by the management service from the client device, the sent at least one volume encryption sample, the received at least one encryption sample comprising: at least one volume encryption status generated based on a plurality of encryption states for the at least one operating system volume and the at least one non-operating-system volume;
determine compliance by the management service, by examining the received at least one encryption sample and checking if the received at least one encryption sample is encrypted according to the transmitted first portion of the encryption rules; and
generate, by the management service, a console user interface that indicates compliance status information according to the determined compliance for the at least one operating system volume and the at least one non-operating-system volume.

9. The non-transitory computer-readable medium according to claim 8, wherein the console user interface comprises a notification that identifies a violation of at least one of the encryption rules and a recommended remedial action.

10. The non-transitory computer-readable medium according to claim 8, wherein the encryption rules comprise: operating system volume encryption rules, non-operating-system volume encryption rules, and removable drive encryption rules.

11. The non-transitory computer-readable medium according to claim 8, wherein the encryption rules comprise at least one multiple-volume encryption rule that applies to a plurality of local drive volumes of the client device.

12. The non-transitory computer-readable medium according to claim 8, wherein the at least one volume encryption sample comprises: a unique device identifier of the client device, an operating system volume encryption status, an operating system volume encryption type, and an indication of system volume encryption adequacy with respect to an encryption type specified in the encryption rules for the client device.

13. The non-transitory computer-readable medium according to claim 12, wherein the at least one volume encryption sample further comprises volume-specific encryption data for a plurality of local volumes comprising at least one non-operating-system fixed drive volume.

14. The non-transitory computer-readable medium according to claim 13, wherein the plurality of local volumes of the client device comprise: at least one removable drive volume.

15. A system, comprising: at least one computing device; and instructions accessible by the at least one computing device, wherein the instructions, when executed, cause the at least one computing device to at least: identify, by a management service executed in a cloud computing environment, encryption rules for a plurality of local volumes of a client device, the plurality of local volumes comprising at least one operating system volume and at least one non-operating-system volume and the encryption rules including a first portion that specifies encryption parameters and a second portion that specifies information to include in encryption samples;
transmit, by the management service to the client device, the encryption rules for the plurality of local volumes of the client device;
wherein the client device:
encrypts the at least one operating system volume according to and using the transmitted encryption parameters,
identifies the transmitted specified information,
collects at least one volume encryption sample from the encrypted at least one operating system volume according to the identified specified information, and
sends the collected at least one volume encryption sample to the management service;
receive, by the management service from the client device, the sent at least one volume encryption sample, the received at least one encryption sample comprising: at least one volume encryption status generated based on a plurality of encryption states for the at least one operating system volume and the at least one non-operating-system volume;
determine compliance by the management service, by examining the received at least one encryption sample and checking if the received at least one encryption sample is encrypted according to the transmitted first portion of the encryption rules; and
generate, by the management service, a console user interface that indicates compliance status information according to the determined compliance for the at least one operating system volume and the at least one non-operating-system volume.

16. The system according to claim 15, wherein the console user interface comprises a notification that identifies a violation of at least one of the encryption rules and a recommended remedial action.

17. The system according to claim 15, wherein the encryption rules comprise: operating system volume encryption rules, non-operating-system volume encryption rules, and removable drive encryption rules.

18. The system according to claim 15, wherein the encryption rules comprise at least one multiple-volume encryption rule that applies to a plurality of local drive volumes of the client device.

19. The system according to claim 15, wherein the at least one volume encryption sample comprises: a unique device identifier of the client device, an operating system volume encryption status, an operating system volume encryption type, and an indication of system volume encryption adequacy with respect to an encryption type specified in the encryption rules for the client device.

20. The system according to claim 19, wherein the at least one volume encryption sample further comprises volume-specific encryption data for a plurality of local volumes comprising at least one non-operating-system fixed drive volume.

* * * * *